United States Patent [19]
Sawayama et al.

[11] 3,866,144
[45] Feb. 11, 1975

[54] MICROWAVE OSCILLATOR

[76] Inventors: Yoshihiko Sawayama, 1806 Nagota-cho, Minami-ku; Kenji Hirai, 4421-23, Akuwa-cho, Seya-ku, both of Yokohama, Japan

[22] Filed: Nov. 5, 1973

[21] Appl. No.: 412,836

[30] Foreign Application Priority Data

Nov. 9, 1972 Japan .............................. 47-11158
Aug. 30, 1973 Japan .............................. 48-96679

[52] U.S. Cl. .................. 331/107 G, 331/96, 331/99
[51] Int. Cl. .............................................. H03b 7/14
[58] Field of Search ............ 331/96, 99, 101, 107 R, 331/107 G, 107 T; 333/22, 83

[56] References Cited

UNITED STATES PATENTS 3,626,327 12/1971 Luchsinger .......................... 331/96
3,737,804 6/1973 Sakamoto ...................... 331/107 G
3,803,513 4/1974 Oya .................................... 331/96

*Primary Examiner*—John Kominski
*Attorney, Agent, or Firm*—Flynn & Frishauf, P. C.

[57] ABSTRACT

A microwave oscillator comprising a rectangular waveguide; a Gunn diode oscillation element provided in the waveguide at the center; a metal post for impressing D.C. bias voltage on the Gunn diode oscillation element; an E-branch waveguide connected to one end of the rectangular waveguide and filled with a microwave absorbing substance so as to have a smaller impedance than the characteristic impedance of the rectangular waveguide; a cylindrical cavity high-Q resonator connected to the rectangular waveguide through the serially arranged E-branch waveguide; and an inductive coupler disposed at the other end of the rectangular waveguide.

20 Claims, 21 Drawing Figures

MICROWAVE OSCILLATOR

BACKGROUND OF THE INVENTION

This invention relates to a microwave oscillator and more particularly to a microwave oscillaator circuit provided with a high-Q resonator to stabilize oscillation frequency.

Prominent frequency stability is demanded of a microwave oscillator used in various electronic appliances including telecommunication apparatus. A microwave oscillator consisting of a solid oscillation element is generally sensitive to changes in the external conditions in which it is operated, namely, considerably affected by variations in the ambient temperature, load, power source voltage, etc. To minimize the effect of these varying external conditions in which the microwave oscillator is applied, there have hitherto been adopted, for example, a thermostat, automatic frequency control loop and injection locking process. However, all the associated devices are of complicated arrangement and expensive. Further, there has been provided a microwave oscillator using a high-Q resonator to stabilize oscillation frequency. This type of microwave oscillator is of simple construction, though indicating a passive function and has its oscillation frequency determined almost exclusively by that of the high-Q resonator, and is superior to any other prior art microwave oscillators in that said high-Q resonator type microwave oscillator is substantially free from the effect of variations in the operating parameters and load. However, this type of microwave oscillator still has the drawbacks that the high-Q resonator constitutes a multiresonance load circuit with respect to the oscillation element to provide numerous operation stabilizing points, prominently increasing the possibility that mode jump or hysteresis takes place when the high-Q resonator pulls in the frequency of the oscillation element. Another conventional microwave oscillator has the magnetron or klystron provided with a separate cavity resonator for stabilization of oscillation. For practical application of a microwave oscillator equipped with a solid oscillation element, for example, the Gunn diode or IMPATT (impact avalanche transit time) diode capable of operating over the range of frequencies having a considerably broad band width, it is required additionally to provide an oscillation stabilizing device fully matching a microwave oscillator having such broad band width frequency characteristics. Where a microwave oscillator using such an oscillation stabilizing device is to be put to practical application, not only the stabilization factor and stabilization pull-in frequency band width but also a loss incurred by a microwave oscillator should be taken into consideration.

There will now be described by reference to FIGS. 1 to 3 a band reflection type stabilized microwave oscillator proposed to date. FIG. 1 shows the equivalent circuit of said oscillator. It will be noted that the various elements used in said circuit have impedances normalized by the characteristic impedance of a transmission line 13. A series circuit consisting of a high-Q parallel resonator 11 and a nonreflection terminal end 12 ($r_1$) is connected to an oscillation element circuit 14 through the transmission passageway 13 having a length equal to half the wavelength corresponding to the resonance frequency of the high-Q resonator 11. An output oscillation signal from the oscillation element circuit 14 is supplied to a matching load 15 disposed parallel with said circuit 14.

FIG. 2 is a Smith chart showing the locus of the normalized input admittance of the stabilized microwave oscillator of FIG. 1 as viewed in the direction of the indicated arrow. The arrows on the locus denote the direction in which the oscillation frequency of the stabilized microwave oscillator gradually increases. The points A and B on said locus respectively indicate the tuning and detuning points in the high-Q resonator 11. The stabilized oscillation circuit carries out stable oscillation in a single mode on the left portion of the circular locus of the normalized input admittance $y$ and also in the proximity of the resonance point, but does not make any oscillation at the highest point C and lowest point D on the locus. A loss incurred by the high-Q resonator when used in a circuit indicates $1 + 1/r_0 + 1$. This value grows smaller as the normalized resistance $r_0$ increases. From the standpoint of stabilizing oscillation frequency, however, it is demanded to set the normalized resistance $r_0$ at a value of 2 or 3.

With the prior art microwave oscillator of FIGS. 1 and 2, the stabilization pull-in frequency band width falls within the C-A-D range. Referring to the stability of said oscillator to variations in the load, it is difficult to assure the reliable initiating of oscillation and the pull-in of oscillated frequencies in the resonance frequency of a resonator with respect to all phase differences between the incident wave and reflected wave when VSWR has a larger value than 2.

The prior art microwave oscillation circuit of FIG. 1 should have its stabilized resistor 12 so set as to constitute a nonreflection terminal end with respect to the transmission line 13 in order to suppress any unnecessary oscillation occurring over the range of broad band width frequencies at the time of detuning. Where the oscillation stabilizing resistor 12 does not match ($r_1$ 1) the transmission line 13, then the prior art microwave oscillator will stop oscillation or otherwise present multimode oscillation. For example, where a normalized resistance $r_1$ has a smaller value than 1, then a desired resonance loop has a larger circumference as shown in FIG. 3, seemingly elevating oscillation stability. In this case, however, the locus of normalized input admittance relative to other frequencies than the desired broad band width frequencies is carried into the prescribed resonance loop by the effect of the transmission line 13, resulting in the occurrence of multimode oscillation or presenting difficulties in attaining the stable pull-in of oscillated frequencies in the resonance frequency. Accordingly, the prior art microwave oscillator of FIG. 1 which should have its resistor 12 fully matched with the transmission line can not be expected to realize higher oscillation stability and a broader stabilization pullin frequency band width.

SUMMARY OF THE INVENTION

It is accordingly the object of this invention to provide a microwave oscillator attaining stable oscillation with a desired angle frequency.

According to an aspect of this invention, there is provided a microwave oscillator comprising a transmission line; an oscillation circuit formed of a solid oscillation element and connected to the transmission line at an intermediate point; a series circuit including an oscillation stabilizing resistor having a smaller impedance than the characteristic impedance of the transmission line and connected to one end of the transmission line and a high-Q resonance circuit; and a reactance coupling device connected to the other end of the transmission line.

DETAILED DESCRIPTION OF THE PREFERRED EMBODIMENTS

There will now be described by reference to the appended drawings a microwave oscillator according to various embodiments of this invention. Throughout the description, the same parts are denoted by the same numerals.

Figure 1:
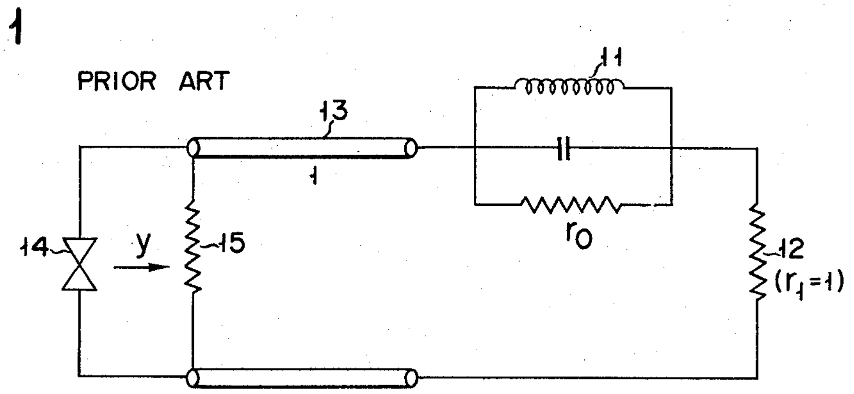
FIG. 1 PRIOR ART
FIG. 1 schematically illustrates the equivalent circuit of a prior art microwave oscillator.
Figure 2:
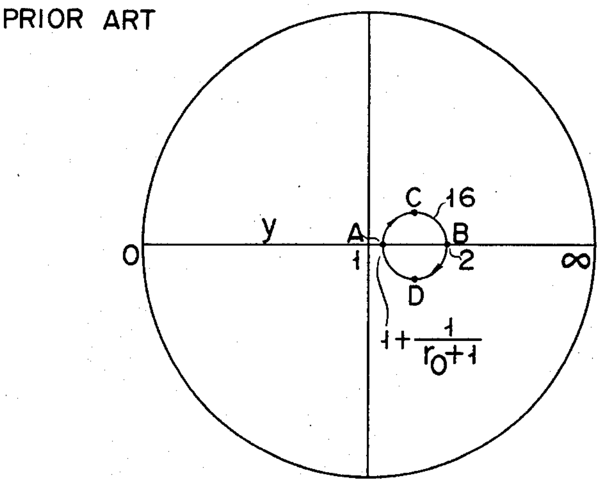
PRIOR ART FIG. 2
FIGS. 2 and 3 are Smith charts showing the locus of the input admittance of the oscillation circuit of FIG. 1.
Figure 3:
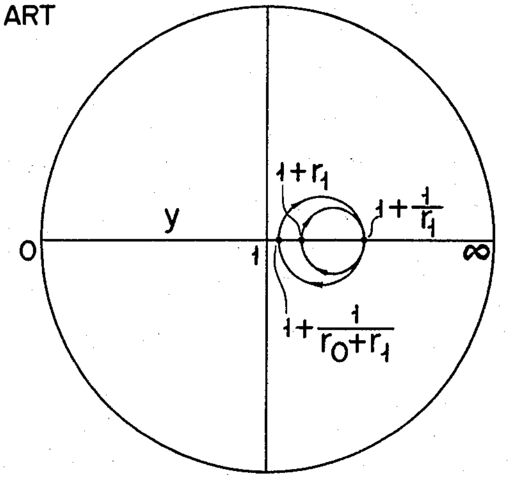
PRIOR ART FIG. 3
Figure 4:
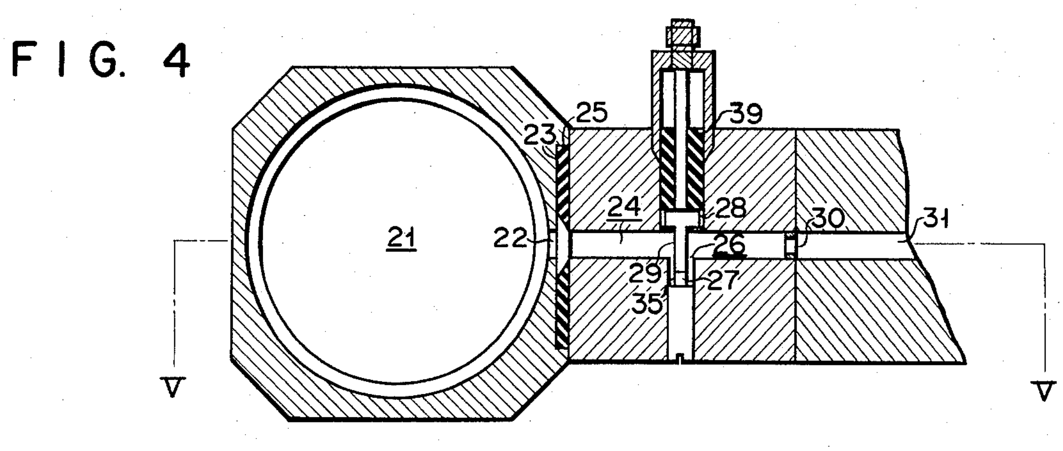
FIG. 4 is a sectional view of a microwave oscillator according to an embodiment of this invention.
Figure 5:
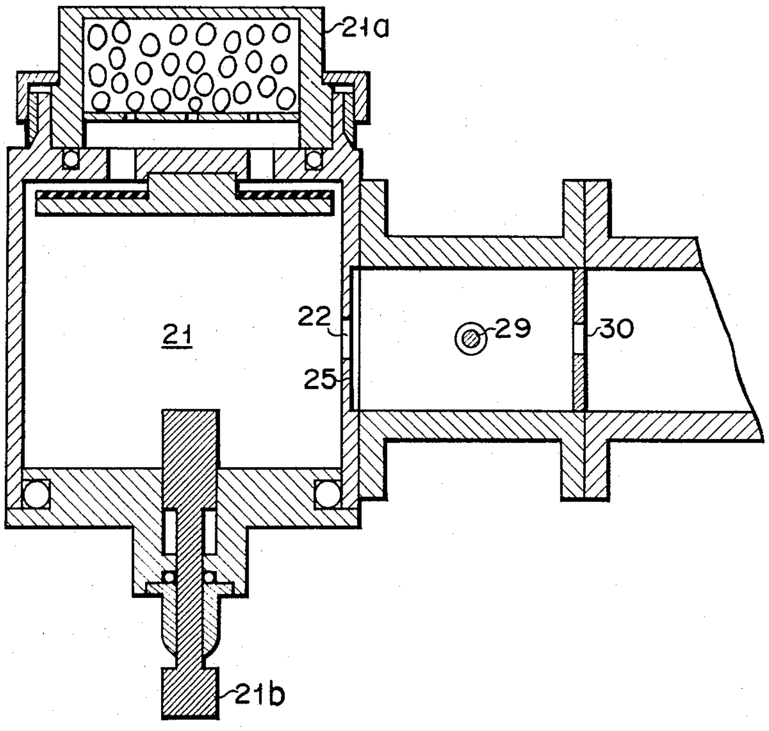
FIG. 5 is a sectional view on line V—V of FIG. 4.

A microwave oscillator of FIGS. 4 and 5 has a high-Q cylindrical cavity resonator consisting of, for example, invar displaying a prominent stability to temperature. This high-Q cavity resonator 21 is provided with a dryer 21*a* for keeping dry the interior of the cavity section so as to prevent resonance frequency from varying with temperature and a tuner 21*b* for adjusting resonance frequency. The high-Q further has a coupling window 22 bored in the wall, which communicates with the main waveguide or transmission line 24 through an E-branch waveguide 23 connected to said window 22. The E-branch waveguide 23 is filled with an electric wave absorber, for example, Epoiron (trade mark) to constitute an oscillation stabilizing resistor 25, namely, a resistance terminal end. An oscillation circuit 26 is provided at a point $n\lambda g/2$ (wherein n is a positive integer and $\lambda g$ is the guide wavelength) spaced from the junction of the E-branch and main waveguides 23 and 24 along the main waveguide 24. The oscillation circuit 26 comprises a Gunn diode oscillation element 27 disposed on the end face of a coaxial circuit embedded in the wall of the transmission line 24 and a metal post 29 connected to the main waveguide 24 through an RF bypass choke 28 so as to impress bias voltage on said Gunn diode oscillation element 27. Electric waves leaking from the bypass choke is absorbed by an electric wave absorber 39. A partition wall bored with a window constituting an inductive coupler 30 is built at a point spaced $m\lambda g/2$ (where $m$ is a positive integer) from the oscillation circuit 26 along the transmission line 24 in the opposite direction to the resonator 21. The transmission line 24 is connected to a load waveguide transmission line 31 through said inductive coupler 30. Thus, the main waveguide transmission line 24 having both ends defined by the partition wall constituting the inductive coupler 30 and the high-Q resonator 21 forms a separate cavity resonator from the high-Q resonator 21.

Where bias voltage is impressed on the Gunn diode oscillation element 27 included in a double oscillation circuit type microwave oscillator constructed as described above, then the oscillation frequency of the oscillation circuit 26 is pulled into the resonance frequency of the high-Q cavity resonator 21. Accordingly, the oscillation mode of the subject microwave oscillator is determined by the resonance frequency of the high-Q resonator 21.

According to the foregoing description, the high-Q resonator 21 includes a dryer 21*a* and tuner 21*b*. However, these elements may be omitted to simplify the construction of the subject microwave oscillaator as a whole.

Figure 6:
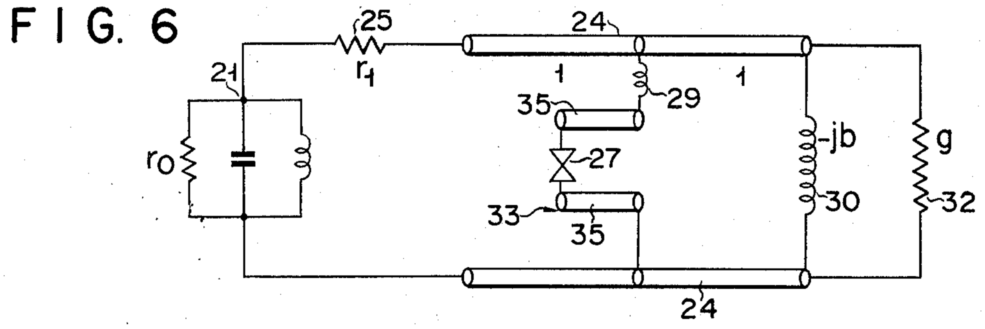
FIG. 6 is an equivalent circuit of the microwave oscillator of FIGS. 4 and 5.

FIG. 6 is an equivalent circuit diagram showing the microwave oscillator of FIGS. 4 and 5 using lumped constants. As seen from this equivalent circuit diagram, a series circuit consisting of an oscillation stabilizing resistor 25 ($r_1$) constituting a resistance terminal end and the high-Q resonance circuit 21 is connected to one end of the main waveguide transmission line 24, the other end of which is connected to an inductive susceptance 30 ($-jb$) and load conductance 32 ($g$). The oscillation circuit 26 has an inductor constituted by a metal post 29 connected to the center of the main waveguide transmission line 24 and a diode circuit 33.

There will now be described the operation and effect of the subject microwave oscillator constructed as described above.

The impedance of a series circuit consisting of the oscillation stabilizing resistor 25 and high-Q resonator 21 indicates a value of $r_0 + r_1$ at the tuning frequency and a value of almost $r_1$ at the detuning frequency. These values of impedance remain the same as viewed from the oscillation circuit 26 spaced $n\lambda g/2$ from the high-Q resonator 21 along the main waveguide transmission line 24. A circuit consisting of a load conductance 32, inductive susceptance 30, main waveguide transmission line 24 and inductor 29 has substantially the same arrangement as a reactance-coupled half wave filter circuit and can pass signals having frequencies of similar band width.

Figure 7A:
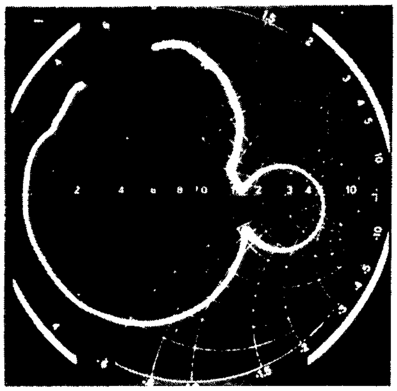
FIGS. 7A and 7B are Smith charts showing measured and calculated data on the normalized input admittance of the microwave oscillator of FIGS. 4 and 5.
Figure 7B:
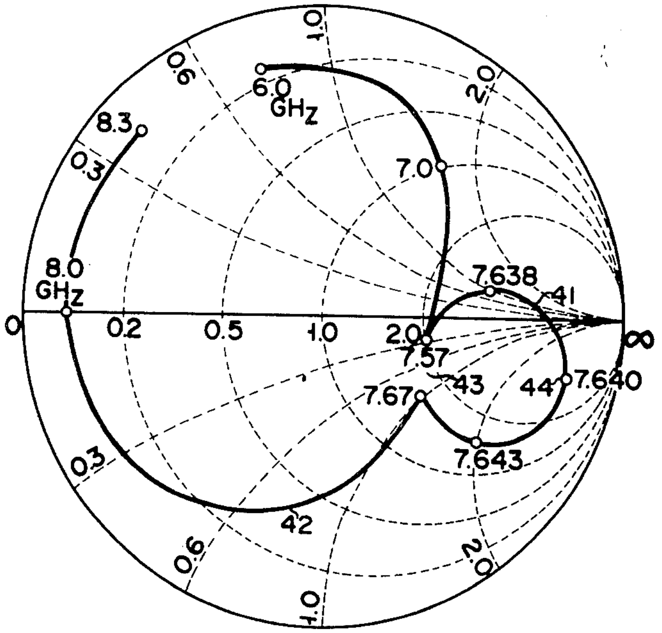

FIGS. 7A and 7B are Smith charts respectively showing the measured and calculated frequency characteristics of the admittance of a load circuit as viewed from both ends of the Gunn diode oscillation element 27. Both values of said admittance were obtained with the parameters set as follows:

Q of high-Q resonator 21 = 16,000
$f_0$ = 7.64 GHz
$g$ of conductance 32 = 0.5
$b$ of inductive susceptance 30 = 5
$r_0$ = 5
$r_1$ = 0.5
operation frequency range = 6 to 8.3 GHz The values of the above parameters of $g$, $b$ and $r_0$ were obtained by being normalized by the characteristic admittance or impedance of the main waveguide transmission line 24. The locus of said admittance shows a snowman-like form having a neck 43 in which a first mode 41 indicating the resonance characteristics of the high-Q resonator 21 is coupled with a second mode 42 denoting the frequency characteristics of the admittance of a half wave filter-simulating circuit. The Q of said half wave filter-simulating circuit is associated with the size of the coupling window 30 and is substantially proportional to a square of the value of the inductive susceptance 30.

Where, in a microwave oscillator according to an embodiment of this invention, the Q of the half wave filter-simulating circuit is set at a smaller value than one-tenth of the Q of the high-Q resonator 21, but not at an extremely small value, then the loci representing the first and second modes do not intersect or overlap each other but are so coupled as to provide an opening 43. A load circuit having the above-mentioned frequency characteristics attains a full separation of modes and very reliably carries out oscillation in a single mode without giving rise to any lupteresis in the neighborhood of the tuning point 44 of the high-Q resonator 21. Reverting to FIG. 6, $r_1$ and $r_0$ can be chosen to have such values as $r_1 << r_0$ and $r_1 < 1$, enabling the first resonance mode 41 to indicate an impedance fully distinguished between tuning an detuning. Further, if the coaxial line 35 of the oscillation circuit 26 has its characteristic impedance and length properly selected, then the Gunn diode oscillation element 27 will be supplied with an optimum load impedance.

The microwave oscillator of this invention, wherein the high-Q resonator 21 has a very excellent stability to temperature and moreover its operation can be stabilized over a far broader range than has been possible with the prior art, enables changes in the parameters of the various elements originating with variations in the power source voltage and temperature to be sufficiently absorbed for stabilization of oscillation.

The microwave oscillator of this invention has a property of suppressing noises. Where a microwave oscillator is used as the local oscillator of a hetrodyne receiver, difficulties generally arise from noises delivered from the microwave oscillator in the offcarrier frequency bands, which lead to the decline of the noise index of the receiver. However, the microwave oscillator of this invention has a filter circuit provided for a load, and consequently the high-Q resonator 21 very effectively suppresses oscillator noises with respect to the offcarrier frequency bands.

There will now be described by reference to FIG. 8 the results of experiments carried out on an oscillation output (indicated in a broken line) and oscillation frequency (shown in a solid line), both varying with bias voltage. The experiments were made under the following conditions:

Resonance frequency $f_0$= 7,455 MHz
Resistance of high-Q resonator 21 $r_0$= 3
Oscillation stabilizing resistance $r_1$= 0.25
Q of high-Q resonator 21 Q = 16,000
Inductive susceptance $b$ = 5

Figure 8:
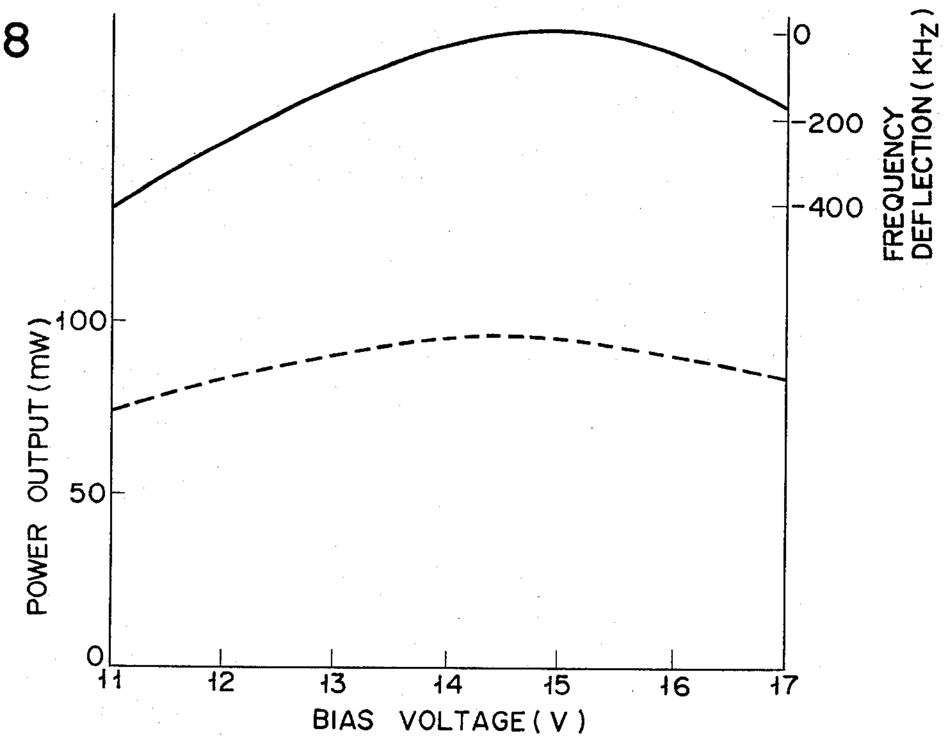
FIGS. 8 and 9 schematically illustrate the oscillation characteristics of the microwave oscillator of FIGS. 4 and 5.

As apparent from FIG. 8, the microwave oscillator of this invention was saved from any hysteresis with respect to broad variation in bias voltage and reliably attained an instantaneous start and frequency pull-in when power was supplied at the respective bias points. Further, the subject oscillator had its frequency only varied within the range of ± 300 kHz at ambient temperature of 0° to 50°C, and displayed prominent stability to load variations. For example, even when VSWR had a value larger than 2, but smaller than 4 or 5, the oscillator was saved from the stoppage of oscillation with respect to all phase differences between incident waves to the load and those reflected therefrom, and also from the occurrence of a mode jump.

Figure 9:
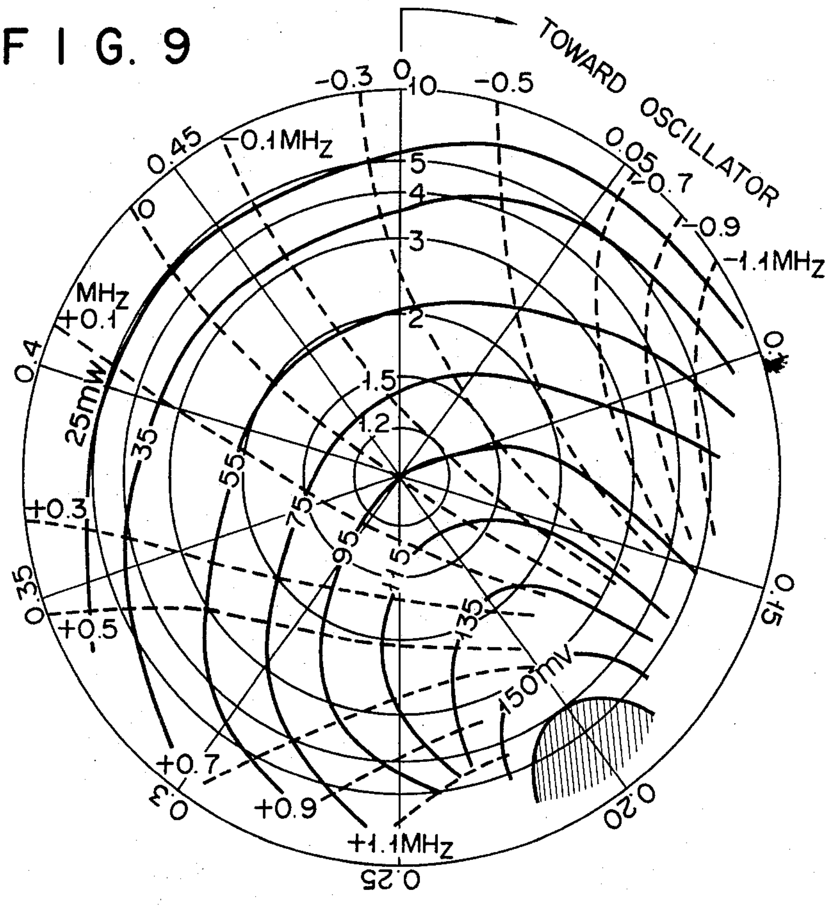

FIG. 9 is a Ricke diagram showing those variations in the oscillation output and oscillation frequency of a cavity-stabilized Gunn oscillator according to another embodiment of this invention, which correspond to changes in the load. In this case, the resonance frequency was determined to be $f_0$= 7,675 MHz and the bias voltage to be $V_P$= 12V.

Figures 10, 11, 12:
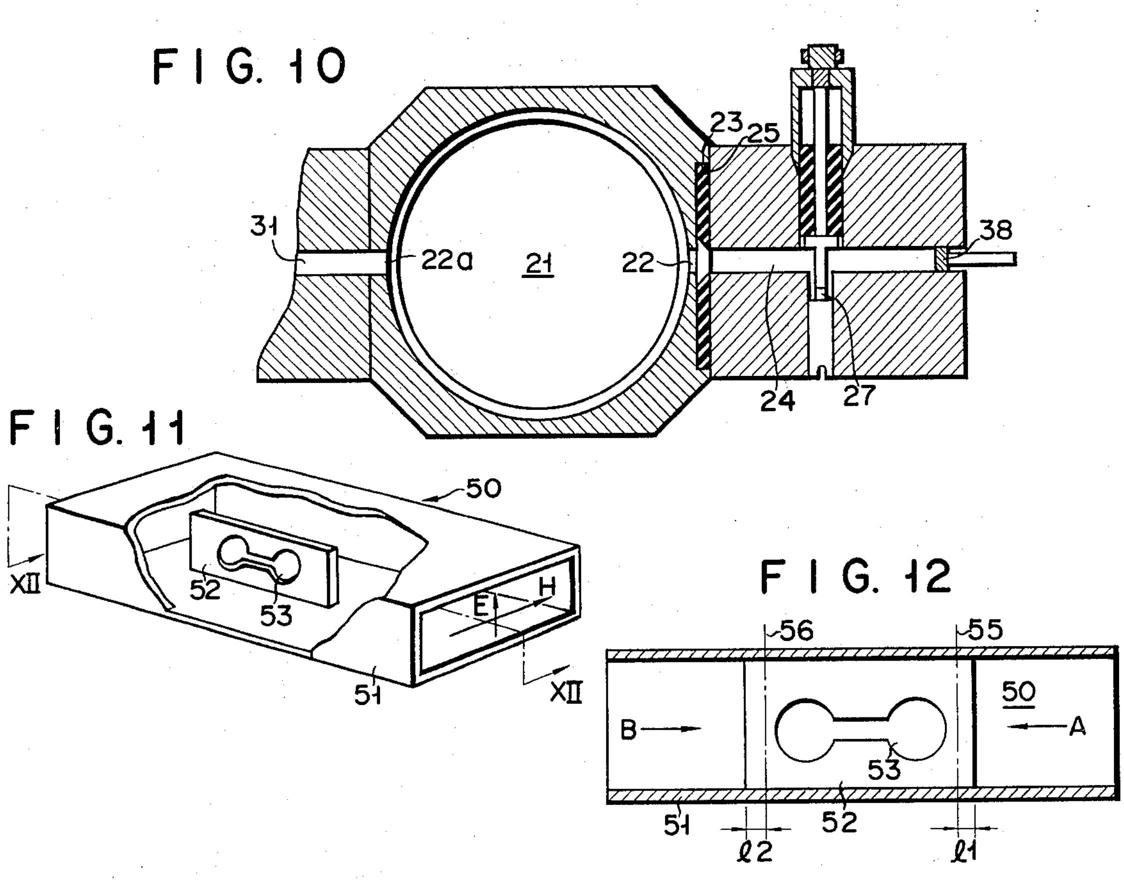
FIG. 10 presents a modification of the microwave oscillator of FIGS. 4 and 5.
FIG. 11 is an oblique view, partly in section, of an oscillation circuit used in a microwave oscillator according to another embodiment of the invention.
FIG. 12 is a sectional view on line XII—XII of FIG. 11.

FIG. 10 shows a modification of the microwave oscillator of FIGS. 4 and 5. This modification is substantially the same as that of FIGS. 4 and 5, except in the following respects:

1. The microwave oscillator of FIGS. 4 and 5 had one end of the main waveguide transmission line 24 connected to the load waveguide transmission line 31 through the inductive coupler 30, whereas the microwave oscillator of FIG. 10 had one end of said main waveguide transmission line 24 short-circuited at a suitable point by a slidably inserted short-circuiting device 38. This device 38 plays the same role as the inductive coupler 30 of FIGS. 4 and 5.

2. The high-Q cylindrical cavity resonator 21 of the microwave oscillator of FIG. 10 has not only the coupling window 22 communicating with the main waveguide transmission line 24, but also a coupling window 22a communicating with the load transmission line 31.

The microwave oscillator of FIG. 10 displays prominent oscillation characteristics like that of FIGS. 4 and 5.

There will now be described by reference to FIGS. 11 to 13 a microwave oscillator according to another embodiment of this invention. In this embodiment, the high-Q cylindrical cavity resonator 21 was replaced by a three-dimensional plane resonator 50. This resonator 50 comprises a rectangular waveguide 51 and a metal plate 52 so disposed at the center of the bottom wall of said waveguide 51 as to be parallel with the plane E and perpendicular to the plane H of said waveguide 51. The metal plate 52 is bored with a dumbbellshaped cutout portion 53 constituting a plane resonance circuit. This resonator 50 has its intrinsic resonance frequency determined by the shape and size of said cutout plane resonance circuit. Referring to FIG. 12, when the resonator 50 is observed in the direction of the indicated arrow A, the plane 55 of the resonator 50 in which short-circuiting takes place at the time of detuning is brought to a point spaced a distance $l_1$ from one end of the metal plate 52. Similarly as viewed in the direction of the indicated arrow B, said detuning short-circuiting plane 56 is placed at a position separated $l_2$ from the opposite end of the metal plate 52. While the resonator 50 is resonating, said detuning short-circuiting plane 56 is changed to an open circuit plane.

Figure 13A:
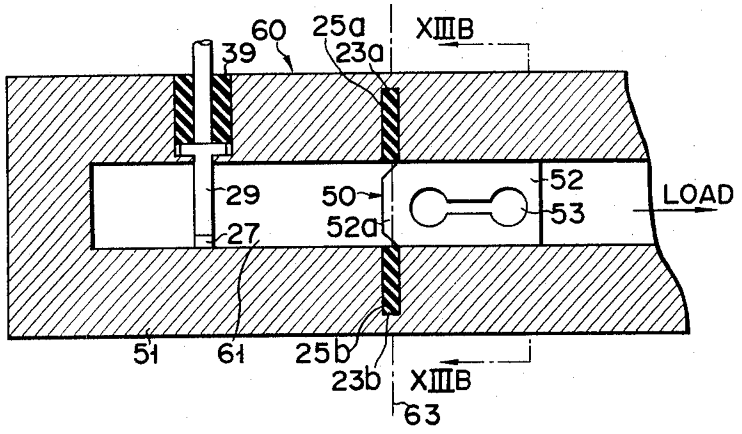
FIG. 13A is a sectional view of a microwave oscillator using the oscillation circuit of FIGS. 11 and 12.
Figure 13B:
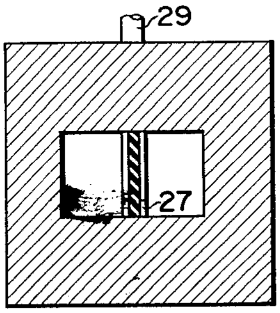
FIG. 13B is a sectional view on line XIIIB—XIIIB of FIG. 13A.

FIGS. 13A and 13B show a microwave oscillator 60 using a three-dimensional plane resonator 50. In the rectangular waveguide 51, the Gunn diode oscillation element 27 is formed on the end face of the metal post 29 constituting the RF choke circuit. The microwave absorber 29 absorbs the microwaves whose passage could not be obstructed by the RF choke circuit, thereby preventing microwaves from leaking to a power supply circuit. One end portion of the transmission line 61 of the main rectangular waveguide 51 is short-circuited at a point properly spaced from the Gunn diode oscillation element 27 along said transmission line 61. E-branch wave guides 23*a* and 23*b* bored in the walls of the main waveguide 51 are connected in series to the intermediate part of the main waveguide transmission line 61, namely, at a point spaced substantially $n\lambda g/2$ from the Gunn diode oscillation element 27 along said transmission line 61. The E-branch waveguides 23*a* and 23*b* are filled with microwave resisting substances 25*a* and 25*b* respectively, so as to constitute resistance terminal ends. The metal plate 52 provided with a projection 52*a* at one end and bored with a dumbbell-shaped cutout plane resonance circuit 53 is disposed at the center of the main waveguide 51 between the electrical referential plane of the cutout E-branch waveguides 23*a* and 23*b* and the load. The metal plate 52 is positioned parallel with the plane E and perpendicular to the plane H of the main waveguide (see FIG. 11).

When the three-dimensional plane resonator 50 is observed from the oscillation element 27, the plane of said resonator 50 in which short-circuiting takes place at the time of detuning is located in a plane including the aforesaid projection 52*a* of the metal plate 52. When said detuning short-circuiting plane is aligned with the electrical referential plane of the E-branch waveguides 23*a* and 23*b*, then said detuning short-circuiting plane of the resonator 50 forms an open circuit plane during tuning, thus minimizing the effect of the microwave resisting substances 25*a* and 25*b* filled in the series-arranged E-branch waveguides 23*a* and 23*b*. During detuning, the resonator 50 is short-circuited on the short-circuiting plane 63, and the microwave resisting substances 25*a* and 25*b* alone are electrically effective.

Where, in the microwave oscillator of FIGS. 13A and 13B, the resistance $r$ of the microwave resisting substances 25*a* and 25*b* filled in the series-arranged E-branch waveguides 23*a* and 23*b* is normalized by the characteristic impedance of the transmission line 61 of the main waveguide 51, and set to $0< r< 1$ as in the embodiment of FIGS. 4 and 5, then it will be possible to prevent such oscillation characteristics as are contaminated by a mode jump or hysteresis occurring in the detuning frequency band due to the elongate transmission line. Therefore, the microwave resisting substances 25*a* and 25*b* filled in the series-arranged E-branch waveguides 23*a* and 23*b* respectively are fully effective as stabilizing resistors.

Where the metal plate 52 consists of invar plated with silver, then the microwave oscillator of FIGS. 13A and 13B will have its resonance frequency rendered more stable to ambient temperature. The embodiment of FIGS. 13A and 13B has the advantages that it is not only substantially as effective as the previously described high-Q type cylindrical cavity resonator, but also is sufficiently compact and inexpensive and may be massproduced.

Figure 14:
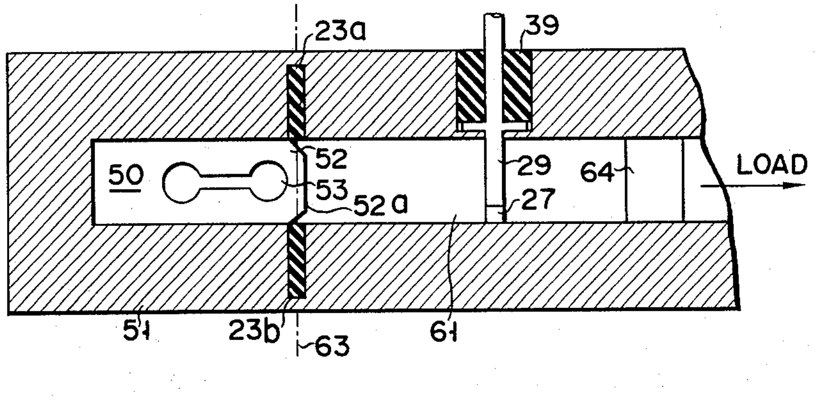
FIG. 14 indicates a modification of the microwave oscillator of FIGS. 13A and 13B.

FIG. 14 indicates a modification of the microwave oscillator of FIGS. 13A and 13B. In the microwave oscillator 60 of FIG. 14, E-branch waveguides 23*a* and 23*b* and the projection 52*a* of the metal plate 52 are formed at a point spaced $n\lambda g/2$ from the oscillation element 27 toward the closed end of the main waveguide 51 along the transmission line 61.

The rear end of the metal plate 50 extends to the closed end of the main waveguide 51. If, however, the metal plate 50 has its rear end portion fully elongated, then attenuating electric waves passing through the regions defined between both sides of the metal plate 52 and the inner walls of the main waveguide 51 will be fully extinguished before reaching the closed end of the main waveguide 51. Therefore, said end of the main waveguide 51 may be left open. For the resonator 50 used as a reflection type in the microwave oscillator of FIG. 14, it is desired that a susceptance element 64 be provided at a suitable point between the oscillation element and a load so as to filter out noises leaking toward the load. In this case, the equivalent circuit of the microwave oscilllator will have substantially the same pattern as in FIG. 6.

There will now be described by reference to FIGS. 15 to 18 a microwave oscillator according to still another embodiment of this invention. The microwave oscillator 70 of FIGS. 15 and 16 comprises a rectangular waveguide 71 closed at one end and connected at the other end to a load (not shown); a semiconductor oscillation element 27 provided in said waveguide 71 at a point properly spaced from its closed end along the transmission line; a metal post 29 for impressing a D.C. bias voltage on the semiconductor oscillation element; and a metal shield 72 positioned parallel with the plane E and perpendicular to the plane H of the waveguide 71. A distance between the oscillator element 27 and the plane of the metal plate 72 in which short-circuiting takes place at the time of detuning and which is opposite to said oscillation element 27 is defined to be $\lambda g/2$. Provided between the metal plate 72 and the side wall of the waveguide 71 is a dielectric resonator 74 containing a dielectric resonance element 73 formed of titanium dioxide ($TiO_2$), or lithium.niobium trioxide ($LiNbO_3$) or barium tetratitanium noneoxide ($BaTiO_9$).

Two lengthwise regions of the waveguide 71 separated by the metal plate 72 shut off electric waves having resonance frequency. The dielectric resonance element 73 supported on cylindrical members 79 made of, for example, quartz glass in one of the above-mentioned regions is magnetically coupled with microwaves transmitted through the waveguide 71 by attenuating microwaves conducted through the dielectric resonator 74. The degree of said coupling is determined by distances $l_3$ and $l_4$ between the center of the dielectric resonance element 73 and both ends of the metal plate 72. The detuning short-circuiting planes 75*a* and 75*b* of the dielectric resonator are formed near both ends of the metal plate 72. In that microwave cut-off region of the waveguide 71 where the dielectric resonance element 73 is not provided, a microwave resisting plate 76 consisting of Epoiron (trade name) is mounted on the detuning short-circuiting plane 75*a*. When a load (not shown) is observed from the oscillation element 27, the detuning short-circuiting plane 75*a* substantially constitutes an open circuit plane while the resonator 74 is resonating. While the resonator 74 is in a detuning condition, said detuning short-circuiting plane 75*a* forms a short-circuiting plane, eventually constituting a resistance terminal end. Speaking in terms of an equivalent circuit, therefore, the above-mentioned events mean that there is present a series circuit consisting of the dielectric resonator 74 and the microwave resisting plate 76. If the resistance $r$ of the microwave resisting plate 76 is normalized by the characteristic impedance of the transmission line of the waveguide 71 and selected to $0< r< 1$, then there will not appear an oscillation mode jump or hysteresis which might otherwise be caused by the effect of the elongated transmission line. If the microwave resisting plate 76 has such a thickness as falls short of the other detuning short-circuiting plane 75*b*, then electric waves having other frequencies than those of resonance and those close thereto will be fully reflected from a load (not shown) to the oscillation element 27.

Figure 15:
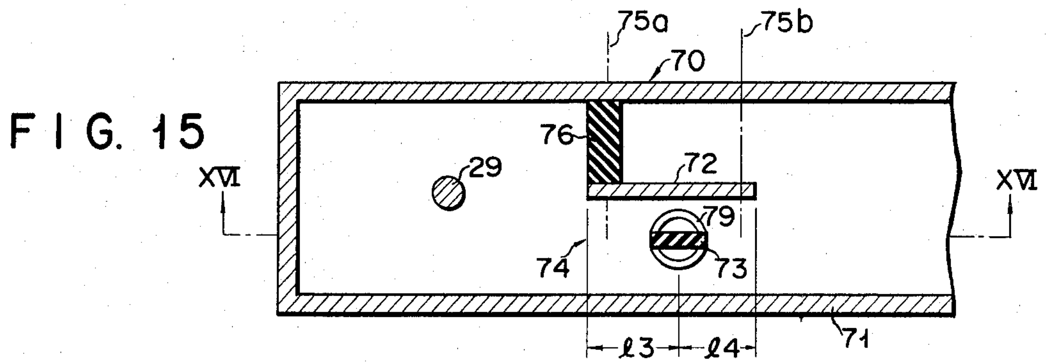
FIG. 15 is a sectional view of a microwave oscillator according to still another embodiment of the invention.
Figure 16:
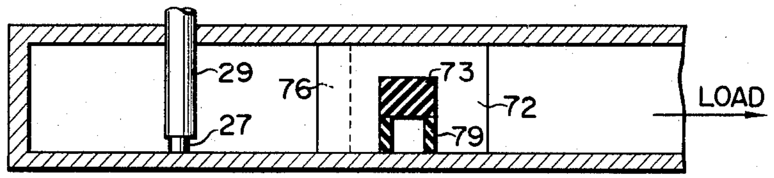
FIG. 16 is a sectional view on line XVI—XVI of FIG. 15.
Figure 17:
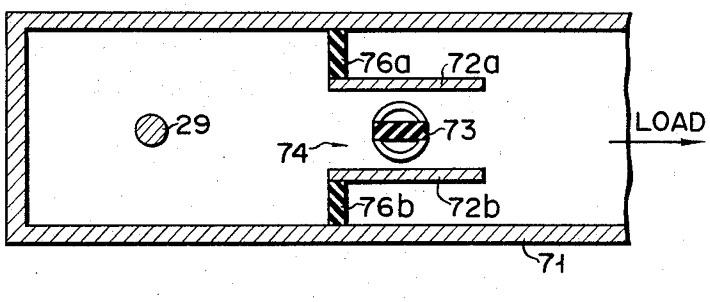
FIGS. 17 and 18 indicate modifications of the embodiments of FIGS. 15 and 16.

FIG. 17 presents a modification of the microwave oscillator of FIGS. 15 and 16. According to this modification, the rectangular waveguide 71 is divided into three microwave cut-off regions by two metal shields 72*a* and 72*b* at a point $n\lambda g/2$ spaced from the metal post 29. Disposed in the central one of said three microwave cut-off regions is the dielectric resonance element 73, which constitutes the dielectric resonator 74 together with the side walls of the waveguide 71 and metal shields 72*a* and 72*b*. As in the embodiment of FIGS. 15 and 16, the microwave resisting plates 76*a* and 76*b* are mounted on the detuning short-circuiting plane. The microwave oscillator of FIG. 17 can have its oscillation frequency pulled in the resonanace mode of the dielectric resonator 74, thereby displaying stable oscillation characteristics.

Figure 18:
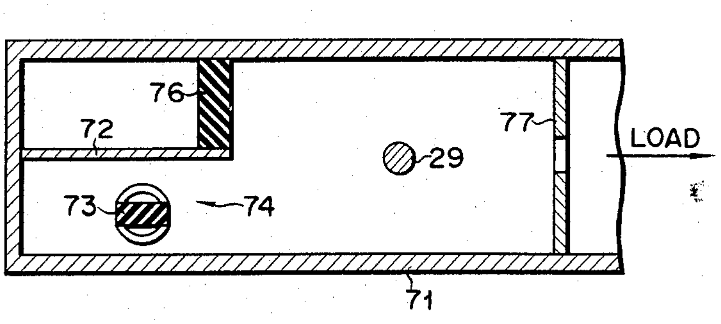

FIG. 18 is still another modification of the microwave oscillator of FIGS. 15 and 16. According to this modification, the waveguide 71 is divided into two microwave cut-off regions by the metal shield 72 at a point spaced $n\lambda g/2$ from the metal post 29 provided in the waveguide 71 together with an oscillation element (not shown) toward the closed end of said waveguide 71. Disposed in one of the two microwave cut-off regions is a dielectric resonance element 73, which constitutes a reflection type resonator 74 together with the side walls of the waveguide 71 and metal plate 72. Where the dielectric resonance element 73 is fully spaced from the closed end of the waveguide 71, then attenuating electric waves passing through the reflection type resonator 74 will be completely extinguished before reaching the closed end of the waveguide 71. An oscillation stabilizing resistor 76 is provided in the other microwave cut-off region. The modification of FIG. 18 displays the same effect as all the preceding embodiments. A susceptance element 77 is positioned at a suitable point between the resonance element 73 and a load (not shown). Since the modification of FIG. 18 includes the reflection type resonator 74, as described above, the susceptance element 77 is intended to suppress noises leaking to the load side. The microwave oscillator of FIG. 18 has substantially the same equivalent circuit as shown in FIG. 6. Further, the waveguide 71 of the microwave oscillator of FIG. 18 may be divided into three microwave cut-off regions by providing two parallel metal shields as in FIG. 17.

Figure 19:
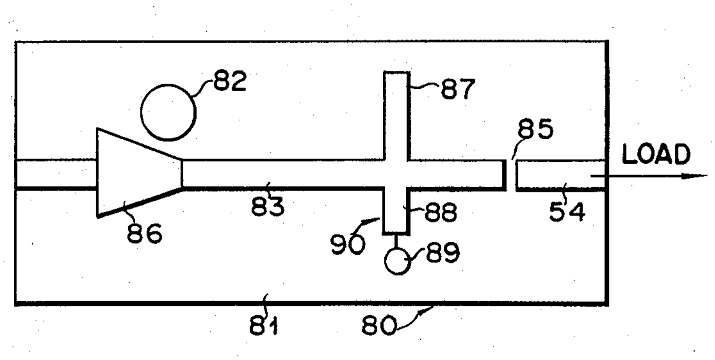
FIG. 19 is a top view of a microwave oscillator according to a further embodiment of the invention.

There will now be described by reference to FIG. 19 a microwave oscillator according to a further embodiment of this invention. This microwave oscillator is a type used with a microwave integrated circuit (MIC), and has a circuit prepared, for example, by evaporating or plating a metal layer on an insulation substrate 81 made of, for example, alumina ceramic material or quartz glass giving rise to little loss of microwaves. A metal film is formed on the backside of the insulation substrate 81. A microwave transmission strip line 83 is capacitively coupled with a load transmission line 54 at a point indicated by referential numeral 85. A high-Q resonator 82 consists of a dielectric resonance element prepared from highly dielectric material. An oscillation stabilizing resistor 86 formed of a thin resistor is coupled with the microwave transmission strip line 83. Bias voltage can be impressed on an oscillation circuit 90 through said oscillation stabilizing resistor 86. This oscillation circuit 90 includes an impedance matching tab 87, impedance converting line 88, and oscillation element 89 connected at one end to said line 88 and at the other end to the metal film formed on the backside of the insulation substrate 81. In the embodiment of FIG. 19, a distance between the oscillation element 89 and the high-Q resonator 82 is chosen to be $n\lambda g/2$ (where $\lambda g$ denotes the wave length of the microwave travelling along the strip line 83) and a distance between the oscillation element 89 and the capacitively coupled section 85 is set at $(2m + 1)x\ \lambda g/4$. The embodiment of FIG. 19 is operated in the same manner and with the same effect as the preceding embodiments, namely, can effectively separate an unnecessary resonance mode from the desired one. It will be noted that this invention is not limited to the foregoing embodiments including modifications thereof. Throughout the embodiments, the oscillation element includes a Gunn diode. However, this diode may be replaced by an IMPATT diode, tunnel diode or BARRITT (barrier injection transit time) diode.

What we claim is:

1. A microwave oscillator comprising a transmission line; an oscillation circuit including a solid oscillation element and connected to the transmission line at an intermediate point; a series circuit including an oscillation cut-off resistor having a smaller impedance than the characteristic impedance of said transmission line and a high-Q resonance circuit, said series circuit being connected to one end of the transmission line; and a reactive coupling means connected to the other end of the transmission line.

2. A microwave oscillator according to claim 1, wherein the transmission line comprises a main waveguide transmission line; the solid oscillation element of the oscillation circuit is disposed in the main waveguide at a point spaced $n\lambda g/2$ (where $n$ is a positive integer and $\lambda g$ denotes the guide wavelength) from one end of the main waveguide; the high-Q resonance circuit comprises a cavity resonator bored with a first opening for connecting said circuit to the main waveguide; the oscillation stabilizing resistor comprises an electric wave absorbing substance filled in E-branch waveguides provided between the cavity resonator and main waveguide; and the reactive coupling means comprises an inductive element.

3. A microwave oscillator according to claim 2, wherein the inductive element is spaced substantially $m\lambda g/2$ (where $m$ is a positive integer) from the solid oscillation element of the oscillation circuit.

4. A microwave oscillator according to claim 3, wherein the solid oscillation element of the oscillation circuit comprises a Gunn diode oscillation element.

5. A microwave oscillator according to claim 2, wherein the inductive element comprises a short-circuiting plate fitted to the other end of the main waveguide so as to slide therethrough; and the high-Q cavity resonator is bored with a second opening for connecting said resonator to a load circuit.

6. A microwave oscillator according to claim 2, wherein the inductive element comprises a short-circuiting plate fitted to the other end of the main waveguide so as to slide therethrough; the solid oscillation element of the oscillation circuit comprises a Gunn diode oscillation element; and the high-Q cavity resonator is bored with a second opening for connecting said resonator to a load circuit.

7. A microwave oscillator according to claim 1, wherein the transmission line comprises a main waveguide transmission line; the solid oscillation element of the oscillation circuit is provided in the main waveguide; the high-Q resonator comprises a supplementary waveguide connected to the main waveguide at a point spaced $n\lambda g/2$ (where $n$ is a positive integer and $\lambda g$ denotes the guide wavelength) from the solid oscillation element of the oscillation circuit and a metal plate extending into the supplementary waveguide from its junction with the main waveguide, positioned parallel with the plane E and perpendicular to the plane H of said supplementary waveguide and bored with an opening so as to form a desired circuit pattern; the oscillation stabilizing resistor comprises an electric wave absorbing substance filled in E-branch waveguides provided at the junction of the main and supplementary waveguides; and the reactive coupling means comprises an inductive element.

8. A microwave oscillator according to claim 7, wherein the main and supplementary waveguides are integrally formed; and the inductive element comprises the short-circuiting terminal end of the main waveguide.

9. A microwave oscillator according to claim 7, wherein the main and supplementary waveguides are integrally formed; the inductive element comprises the short-circuiting terminal end of the main waveguide; and the solid oscillation element of the oscillation circuit comprises a Gunn diode.

10. A microwave oscillator according to claim 7, wherein the main and supplementary waveguides are integrally formed; and the inductive element is spaced $m\lambda g/2$ (where $m$ is a positive integer) from the solid oscillation element of the oscillation circuit.

11. A microwave oscillator according to claim 10, wherein the solid oscillation element comprises a Gunn diode.

12. A microwave oscillator according to claim 1, wherein the transmission line comprises a main waveguide transmission line; the solid oscillation element of the oscillation circuit is provided in the main waveguide; the high-Q resonator comprises a supplementary waveguide connected to the main waveguide at a point spaced $n\lambda g/2$ from the solid oscillation element of the oscillation circuit, a metal plate extending into the supplementary waveguide from its junction with the main waveguide and positioned parallel with the plane E and perpendicular to the plane H of said supplementary waveguide so as to divide the supplementary waveguide into two microwave cut-off regions, and a dielectric resonance element provided in one of said microwave cut-off regions; the oscillation stabilizing resistor comprises an electric wave absorber provided in the other microwave cut-off region between the junction of the main and supplementary waveguides and the metal plate; and the reactive coupling means comprises an inductive element.

13. A microwave oscillator according to claim 12, wherein the main and supplementary waveguides are integrally formed; and the inductive element comprises the short-circuiting terminal end of the main waveguide.

14. A microwave oscillator according to claim 12, wherein the main and supplementary waveguides are integrally formed; the inductive element comprises the short-circuiting terminal end of the main waveguide; and the solid oscillation element comprises a Gunn diode.

15. A microwave oscillator according to claim 12, wherein the main and supplementary waveguides are integrally formed; and the inductive element is spaced $n\lambda g/2$ from the solid oscillation element.

16. A microwave oscillator according to claim 15, wherein the solid oscillation element comprises a Gunn diode.

17. A microwave oscillator according to claim 1, wherein the transmission line comprises a main waveguide transmission line; the solid oscillation element of the oscillation circuit is provided in the main waveguide; the high-Q resonator comprises a supplementary waveguide connected to the main waveguide at a point spaced $n\lambda g/2$ from the solid oscillation element, first and second metal plates extending into the supplementary waveguide from its junction with the main waveguide and positioned parallel with the plane E and perpendicular to the plane H of said supplementary waveguide so as to divide said supplementary waveguide into three microwave cut-off regions and a dielectric resonance element disposed in the central one of said three microwave cut-off regions; the oscillation stabilizing resistor comprises an electric wave absorbing substance provided in both electric wave cut-off regions between the first metal plate and the junction of the main and supplementary waveguides and also between the second metal plate and said junction respectively; and the reactive coupling means comprises the short-circuiting terminal end of the main waveguide.

18. A microwave oscillator according to claim 17, wherein the solid oscillation element comprises a Gunn diode.

19. A microwave oscillator according to claim 1, wherein the transmission line comprises a microwave transmitting strip line provided on one side of the insulation substrate; the solid oscillation element of the oscillation circuit is disposed between the microwave transmitting strip line and the metal film formed on the backside of the insulation substrate at a point spaced $(2n - 1)\lambda/4$ (where $n$ is a positive integer and $\lambda g$ denotes the guide wavelength) from one end of said micrwwave transmitting strip line; the reactive coupling means comprises a capacitive element provided at one end of the microwave transmitting strip line; the oscillation stabilizing resistor comprises a resisting element connected to the other end of the microwave transmitting strip line; the high-Q resonator comprises a dielectric resonance element provided on the insulation substrate at a point spaced $m\lambda g/2$ (where $m$ is a positive integer) from the solid oscillation element.

20. A microwave oscillator according to claim 19, wherein the oscillation element comprises a Gunn diode oscillation element.

* * * * *

UNITED STATES PATENT OFFICE
CERTIFICATE OF CORRECTION

PATENT NO. : 3,866,144
DATED : February 11, 1975
INVENTOR(S) : Yoshihiko SAWAYAMA, et al It is certified that error appears in the above-identified patent and that said Letters Patent are hereby corrected as shown below:

On the initial page of the patent under the heading of "Foreign Application Priority Data" change "Nov. 9, 1972 Japan..............47-11158"

to

--Nov. 9, 1972 Japan..............47-111582--;

Column 12, lines 66-67, change "micrwwave" to --microwave--.

Signed and sealed this 6th day of May 1975.

(SEAL)
Attest:

RUTH C. MASON
Attesting Officer

C. MARSHALL DANN
Commissioner of Patents
and Trademarks